United States Patent
Jang

(10) Patent No.: US 9,085,294 B2
(45) Date of Patent: Jul. 21, 2015

(54) APPARATUS AND METHOD FOR AUTOMATICALLY CONTROLLING A TRANSMISSION OF A WHEEL LOADER

(75) Inventor: In Pyo Jang, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 153 days.

(21) Appl. No.: 13/994,465

(22) PCT Filed: Dec. 26, 2011

(86) PCT No.: PCT/KR2011/010126
§ 371 (c)(1),
(2), (4) Date: Jun. 14, 2013

(87) PCT Pub. No.: WO2012/087086
PCT Pub. Date: Jun. 28, 2012

(65) Prior Publication Data
US 2013/0261908 A1 Oct. 3, 2013

(30) Foreign Application Priority Data
Dec. 24, 2010 (KR) ........................ 10-2010-0134302

(51) Int. Cl.
| G06F 7/00 | (2006.01) |
| B60W 10/11 | (2012.01) |
| E02F 9/20 | (2006.01) |
| B60W 10/30 | (2006.01) |
| E02F 9/26 | (2006.01) |

(52) U.S. Cl.
CPC .............. B60W 10/11 (2013.01); B60W 10/30 (2013.01); E02F 9/2079 (2013.01); E02F 9/265 (2013.01)

(58) Field of Classification Search
None
See application file for complete search history.

(56) References Cited

U.S. PATENT DOCUMENTS

| 4,800,660 A | 1/1989 | Masao |
| 5,214,916 A | 6/1993 | Lukich |
| 5,362,286 A * | 11/1994 | Satoh et al. ................... 477/115 |
| 2013/0041561 A1* | 2/2013 | Asami et al. ................... 701/50 |

FOREIGN PATENT DOCUMENTS

| CN | 101151479 | 3/2008 |
| CN | 101189455 | 5/2008 |
| CN | 101641481 | 2/2010 |

(Continued)

OTHER PUBLICATIONS

Search Report dated Aug. 22, 2012 and written in Korean with English translation attached for International Patent Application No. PCT/KR2011/010126 filed Dec. 26, 2011, 5 pages.

(Continued)

*Primary Examiner* — Adam Alharbi
(74) *Attorney, Agent, or Firm* — John D. Veldhuis-Kroeze; Westman, Champlin & Koehler, P.A.

(57) ABSTRACT

An aspect of the present disclosure has been made in an effort to provide an apparatus and a method of automatically controlling a transmission, capable of increasing work efficiency by removing a time gap between a starting time point when an operation such as excavation of a wheel loader starts and a transmission time point when the kickdown is performed. In addition, an aspect of the present disclosure has been made in an effort to provide an apparatus and a method of automatically controlling a transmission, capable of performing an automatic kickdown transmission at the same time of the starting time point of operation, preferably before the operation is performed.

12 Claims, 3 Drawing Sheets

(56) References Cited

FOREIGN PATENT DOCUMENTS

| | | |
|---|---|---|
| JP | 06-129519 A | 5/1994 |
| KR | 10-2008-0018990 A | 2/2008 |
| KR | 10-2008-0077044 A | 8/2008 |

OTHER PUBLICATIONS

Office Action dated Sep. 11, 2014 in Chinese Patent Application No. 201180061857.9, 8 pages.

* cited by examiner

APPARATUS AND METHOD FOR AUTOMATICALLY CONTROLLING A TRANSMISSION OF A WHEEL LOADER

CROSS-REFERENCE TO RELATED APPLICATION

This application is a Section 371 National Stage Application of International Application No. PCT/KR2011/010126, filed Dec. 26, 2011 and published, not in English, as WO2012/087086 on Jun. 28, 2012.

FIELD OF THE DISCLOSURE

An aspect of the present disclosure relates to an apparatus and a method for automatically controlling a transmission of a wheel loader, and more particularly, to an automatic control method for allowing a kickdown to be automatically performed in a specific stage among a plurality of operational stages in which the wheel loader performs operations.

BACKGROUND OF THE DISCLOSURE

A wheel loader is used in construction, and widely used to perform an excavation operation for excavating soil, sand or the like, a conveyance operation for conveying the excavated soil and sand, loading and unloading operations of loading and unloading the conveyed soil and sand to and from a freight vehicle, soil preparation for road construction, a snow removing operation, a towing operation, or the like.

In accordance with situations of the aforementioned operations of the wheel loader, a transmission control unit of the wheel loader detects a travel speed and a load of the wheel loader and may automatically control a transmission.

For example, when the wheel loader travels on an ascending slope and a large force is required to drive the wheel loader, the transmission may automatically perform a transmission operation by shifting a high gear (for example, shift stage 2) to a low gear (for example, shift stage 1) based on a condition in which a travel speed of the wheel loader becomes slower and a transmission load becomes high.

In addition, when the wheel loader performs an operation such as excavation, or the like, and the transmission load is increased due to the excavation operation in a state in which the travel speed becomes slow so as to perform the excavation operation, a kickdown may be performed by shifting the high gear to the low gear, for example, shifting the shift stage 2 to the shift stage 1.

However, in a case in which a transmission operation is performed by detecting an increase in transmission load during the operation such as excavation, a time point when the transmission operation of the wheel loader is actually performed is delayed from a time point when the excavation operation starts. That is, after the transmission load is increased as the excavation operation is performed, the increased amount of load is detected to be transmitted to the transmission control unit (TCU), and the transmission control unit performs the transmission operation by performing the kickdown of the transmission (TM), for example, from the shift stage 2 to the shift stage 1.

As such, in the method of automatically controlling the transmission in the related art, because there is a difference between a starting time point when the operation such as excavation starts and a transmission time point when the kickdown transmission is actually performed, for example, only after a certain period of time has passed at the beginning since the operation in the shift stage 2, the transmission result into the shift stage 1 is obtained. Therefore, because the transmission operation is performed during the excavation operation, an operator experiences difficulty that the whole work efficiency deteriorates.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An aspect of the present disclosure has been made in an effort to provide an apparatus and a method of automatically controlling a transmission, capable of increasing work efficiency by removing a time gap between a starting time point when an operation such as excavation of a wheel loader starts and a transmission time point when the kickdown is performed.

In addition, an aspect of the present disclosure has been made in an effort to provide an apparatus and a method of automatically controlling a transmission, capable of performing an automatic kickdown transmission at the same time of the starting time point of operation, preferably before the operation is performed.

In addition, an aspect of the present disclosure has been made in an effort to provide an apparatus and a method of automatically controlling a transmission, capable of making a kickdown transmission not be performed in a specific case in which a travel speed is decreased in a low load state as the wheel loader brakes for a loading operation in front of a truck.

In order to achieve the above object, an aspect of the present disclosure provides a method of automatically controlling a transmission of a wheel loader which includes an engine, a transmission connected to the engine, and a transmission control unit for controlling the transmission, the method including: receiving, by the transmission control unit, transmission information including an engine RPM, a transmission load, and a travel speed from a plurality of sensors provided in the transmission; receiving, by the transmission control unit, bucket position information; checking whether a combination of the transmission information and the bucket position information satisfies a predetermined condition; and performing, by the transmission control unit, an automatic kickdown from shift stage 2 to shift stage 1 by driving a clutching means in the transmission, when the predetermined condition is satisfied, in which in the checking, the predetermined condition is satisfied when the transmission load is low, the engine RPM and the travel speed are low, and the bucket position is adjacent to the ground level.

In an aspect of the present disclosure, the bucket position information may be obtained by a boom angle sensor.

In addition, in an aspect of the present disclosure, the method may further include receiving, by the transmission control unit, bucket posture information, in which the predetermined condition is satisfied additionally when a bucket posture is horizontal.

In addition, in an aspect of the present disclosure, the bucket posture information may be obtained by a combination of the boom angle sensor and a bucket angle sensor.

According to an aspect of the present disclosure, it is possible to provide a wheel loader in which a kickdown transmission, for example, from a high gear to a low gear may be performed earlier than a starting time point of an excavation operation.

According to an aspect of the present disclosure, it is possible to provide a wheel loader in which a kickdown transmission of a transmission may be performed based on a condition, for example, in which a travel speed becomes slow for an excavation operation, before the operation is performed.

In addition, according to an aspect of the present disclosure, it is possible to provide a safe wheel loader in which a kickdown transmission is performed based on a condition of a position or a posture of a bucket even in a case in which a travel speed becomes slow in a low load state, and a kickdown transmission is not performed in a specific case such as a loading operation.

Figure 1:
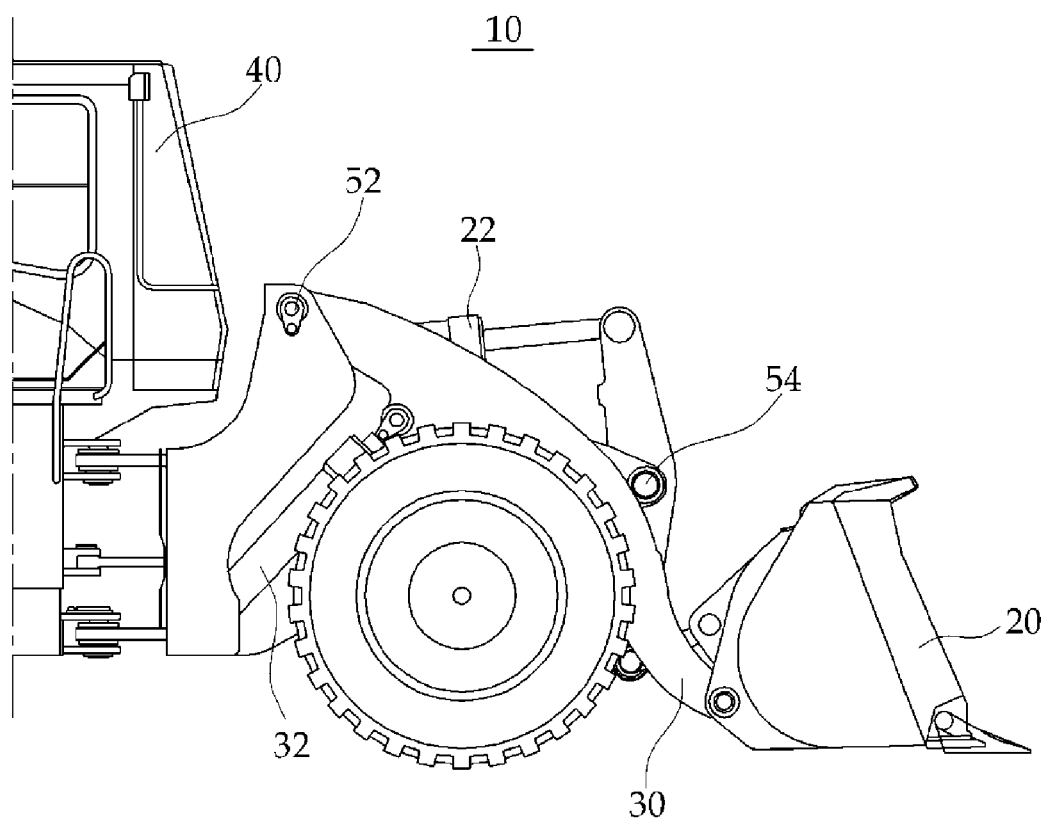
FIG. 1 is a schematic view schematically illustrating a wheel loader used in an aspect of the present disclosure.

Description of Main Reference Numerals of Drawings

| | |
|---|---|
| 10: Wheel loader | 20: Bucket |
| 22: Bucket cylinder | 30: Boom |
| 32: Boom cylinder | 40: Cockpit |
| 52, 130: Boom angle sensor | 54, 132: Bucket angle sensor |
| 110: Transmission control unit (TCU) | 120: Transmission (TM) |
| 122: Sensor | 124: Clutching means |

DETAILED DESCRIPTION

Hereinafter, preferable exemplary embodiments of an aspect of the present disclosure will be described with reference to the drawings.

FIG. 1 is a schematic view illustrating a wheel loader 10 based on a front side where a bucket 20 is provided. Referring to FIG. 1, the wheel loader 10 includes the bucket 20 disposed at a front side of a vehicle, a boom 30 for supporting the bucket, and a driving means such as a bucket cylinder 22 and a boom cylinder 32 for driving the bucket 20 and the boom 30. In addition, the wheel loader 10 includes a cockpit 40 where an operator may be seated.

The wheel loader 10 having the configuration includes a boom angle sensor 52 and a bucket angle sensor 54 in accordance with characteristics of an aspect of the present disclosure. The sensors 52 and 54, for example, detects a position (a height) of the bucket 20 by detecting an angle of the boom 30 that is rotated by an operation of the boom cylinder 32, and may detect a posture of the bucket 20 (for example, a horizontal posture in which a bottom of the bucket is disposed to be parallel to the ground level) through a combination of the boom angle sensor 52 and the bucket angle sensor 54. The information obtained by the sensors 52 and 54 is used in a method of controlling a transmission according to the exemplary embodiment of an aspect of the present disclosure that will be described below.

Figure 2:
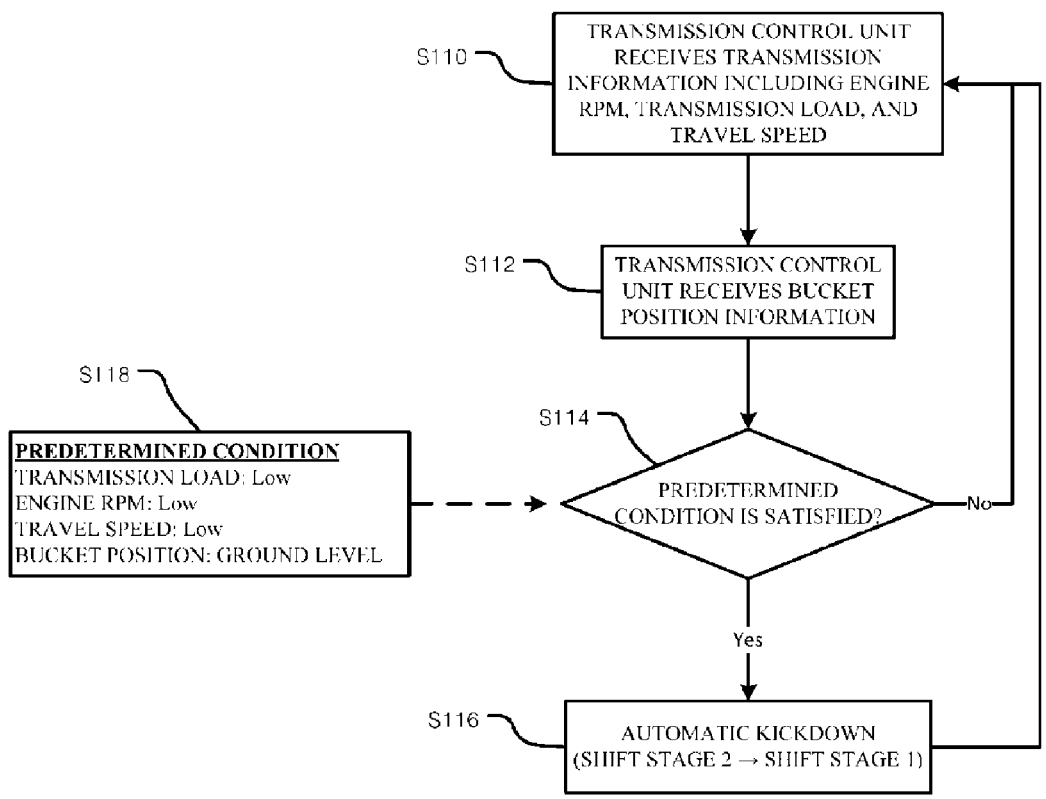
FIG. 2 is a flow chart schematically illustrating an exemplary embodiment of a method of an aspect of the present disclosure.
Figure 3:
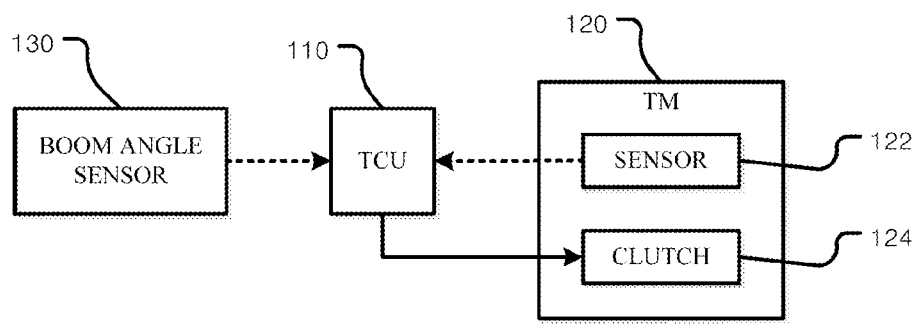
FIG. 3 is a schematic block diagram for explaining the exemplary embodiment of FIG. 2.

Next, FIG. 2 is a flow chart illustrating a method of automatically controlling a transmission, according to an exemplary embodiment of an aspect of the present disclosure, and FIG. 3 is a schematic block diagram suggested for explaining the method of FIG. 2. Hereinafter, a method of controlling a transmission, according to an exemplary embodiment of an aspect of the present disclosure will be described with reference to FIGS. 2 and 3. In FIG. 3, the dotted line means transmission of information (signal), and the solid line means control.

According to the exemplary embodiment, when driving the wheel loader 100, a transmission control unit 110 receives information including engine RPM, turbine RPM of the transmission 120, and a travel speed (S110), the transmission control unit 110 receives bucket position information from a boom angle sensor 130 (S112). To this end, the transmission control unit 120 is connected to a plurality of sensors 122. A part of the sensors 122 is installed at the transmission 120 to output information about a travel speed and an RPM of a turbine installed at an input side of the transmission 120 to the transmission control unit 110. Although not illustrated, a part of the sensors 122 is installed at the engine to output information about an engine RPM to the transmission control unit 110. In addition, as described above, the bucket position information may be obtained by converting a value obtained from the boom angle sensor into a position (a height) of the bucket.

Next, whether the information (engine RPM, a transmission load, a travel speed, and bucket position information) satisfies each condition denoted by S118 is checked, and whether the information satisfies predetermined conditions of S118 is checked (S114). When it is determined that the information satisfies the predetermined conditions, the transmission control unit 110 drives the transmission 120, particularly, drives a clutching means 124 in the transmission 120 so as to perform an automatic kickdown transmission from shift stage 2 to shift stage 1.

Meanwhile, referring to the predetermined conditions of S118, it may be known that the transmission load is low, the engine RPM and the travel speed are low, and the bucket position is at the ground level (or the height adjacent to the ground level). That is, when each of the conditions is satisfied, the automatic kickdown is performed. Here, the transmission load may be calculated in various manners, and in the present exemplary embodiment, the transmission load is calculated based on the RPM of the turbine of the transmission and the engine RPM that are inputted by each sensor. That is, in the present exemplary embodiment, the transmission load is a value of a turbine RPM of the transmission divided by the engine RPM, and is called a speed ratio.

For reference, an operation/driving state of the wheel loader that is operated at present may be estimated based on the information, and an example of the estimation is illustrated in the following Table 1.

TABLE 1

| | Operating/Driving State | | |
|---|---|---|---|
| | Before Excavation | Travelling on ascending Slope | Loading Operation (In front of Truck) |
| Improvement of Transmission Mode | An aspect of the present disclosure | The existing method | The existing method |
| Transmission Load | Low | High | Low |
| Engine RPM equal to or less than 1200 rpm | ○ | X | ○ |
| Bucket Position, Ground Level (Adjacent to the Ground Level) | ○ | ○ | X |
| Travel Speed equal to or less than 3 km/h | ○ | ○ | ○ |
| Automatic Kickdown from Shift Stage 2 to Shift Stage 1 | ○ | ○ (same as the existing method) | X |

As illustrated in Table 1, the left items present each reference regarding information that the transmission control unit receives, in the method of an aspect of the present disclosure. For example, in the method of an aspect of the present disclosure, the transmission load may be classified by whether an amount of load is large or small, and the engine RPM is denoted by the mark X when the engine RPM is more than 1200 rpm as a reference, and the mark O when the engine RPM is equal to or less than the reference. In addition, the bucket position is denoted by the mark O when the bucket position is at the ground level (or adjacent to the ground level), and the mark X when the bucket position is higher than the ground level, that is, the bucket position is raised up to a dump height for a loading operation. In addition, the travel speed is denoted by the mark X when the travel speed is more than 3 km/h as a reference, and the mark O when the travel speed is equal to or less than the reference.

According to Table 1, in a case when the wheel loader travels on an ascending slope, the transmission load is high, the engine RPM is greater than 1200 rpm, and the travel speed is low to be equal to or less than 3 km/h. In this case, the transmission control unit 110 drives the clutching means 124 of the transmission 120 so as to perform the automatic kickdown from the shift stage 2 to the shift stage 1. This is the same conditions as those of the existing automatic control method.

Next, as a characteristic of an aspect of the present disclosure, for example, the state before the excavation operation starts, which is identically to the state before the excavation operation may be presented. For example, the transmission load is low because the state is before the excavation operation is performed, the engine RPM is 1200 rpm, which is lower than the previous case, and the travel speed becomes low to be equal to or less than 3 km/h because a braking operation is performed to perform the excavation operation. At this time, after checking the information about the bucket position, when the bucket position is at the ground level, the kickdown is automatically performed according to the characteristic of an aspect of the present disclosure. That is, according to an aspect of the present disclosure, the transmission for the kickdown may be performed in a case in which the conditions according to the related art are satisfied, and in a case in which any one of the conditions of the present exemplary embodiment is satisfied. Accordingly, the transmission may be performed when the operation having a high travel load is performed, that is, for example, before the excavation operation is performed, the automatic kickdown is performed in advance in accordance with the aforementioned predetermined conditions before the operation is performed, and therefore, the transmission of the wheel loader from the shift stage 2 to the shift stage 1 is performed before the excavation operation is performed. In addition, as the excavation operation starts in a gear state of the shift stage 1, a gap (time delay) between an operation starting time point and a transmission time point may be prevented in advance. Further, efficiency of an operation such as the excavation operation may be improved.

Meanwhile, the information about the bucket position in conditions before the excavation operation is performed may be advantageously used as described below. For example, in a case in which the wheel loader approaches in front of a truck to perform a loading operation, the transmission load is low, the engine RPM is also low as 1200 rpm, and the travel speed becomes low to be equal or less than 3 km/h because the wheel loader brakes to stop in front of the truck. These conditions are the same as those of the aforementioned state before the excavation operation. However, while the bucket position information is the ground level before the excavation operation, for example, the bucket is raised to a height of a container of the truck during the loading operation, which is a difference from the conditions in a state before the excavation operation. Therefore, in a specific case such as the loading operation, even though the conditions in the specific case are similar to the conditions before the excavation operation, the automatic kickdown from the shift stage 2 to the shift stage 1 is not performed by using the bucket position information.

If the automatic kickdown is performed in the loading operation similarly to before the excavation operation, for example, this causes a problem in that freight such as soil loaded in the bucket are spilled due to impact by the automatic kickdown.

As such, an aspect of the present disclosure may provide a method of automatically controlling a transmission, capable of improving operational efficiency by performing the automatic kickdown in advance before an operation such as an excavation operation starts, and preventing the automatic kickdown from being performed in the case of a specific operation such as the loading operation, by setting whether the automatic kickdown is performed based on the information about the bucket position in addition to the information about the transmission load, the engine RPM, and the travel speed.

As described above, the case in which the TCU performs a kickdown control based upon information received from each sensor has been described to explain the transmission control unit. However, the collection of information and the determination of the transmission are not performed only by the TCU. For example, in a case in which a vehicle control unit, which performs the overall control of the vehicle and is connected to the TCU and an engine control unit (ECU), is provided, the vehicle control unit may perform the function of the transmission control unit. That is, the vehicle control unit determines whether the transmission is performed by directly receiving information from each sensor and then outputs a control signal corresponding to the determination result to the transmission control unit, and as a result, the automatic transmission of the vehicle may be performed. Because the vehicle control unit generally has a higher performance than the transmission control unit or the engine control unit, the case in which the vehicle control unit is used may be more efficient than the case in which the transmission control unit is used.

Figure 4:
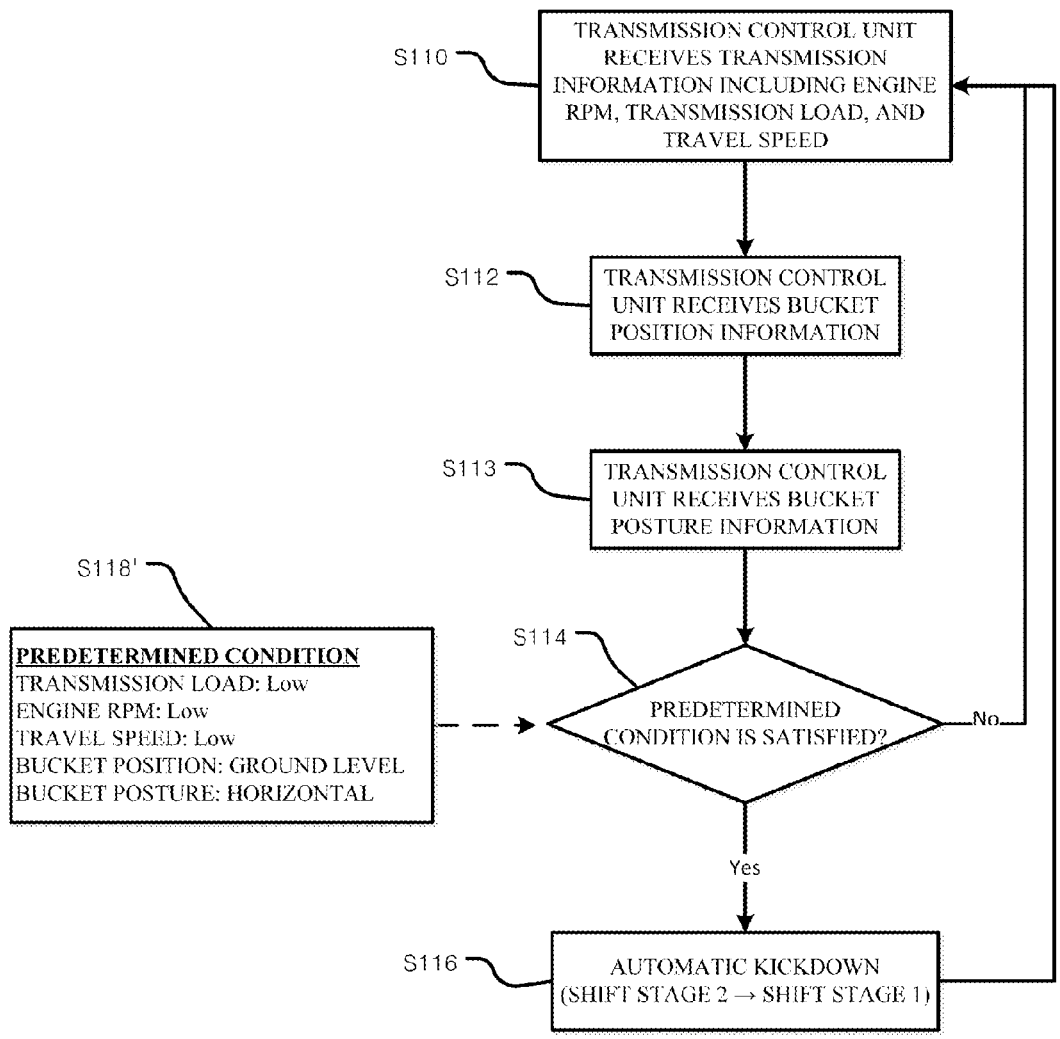
FIG. 4 is a flow chart schematically illustrating another exemplary embodiment of a method of an aspect of the present disclosure.
Figure 5:
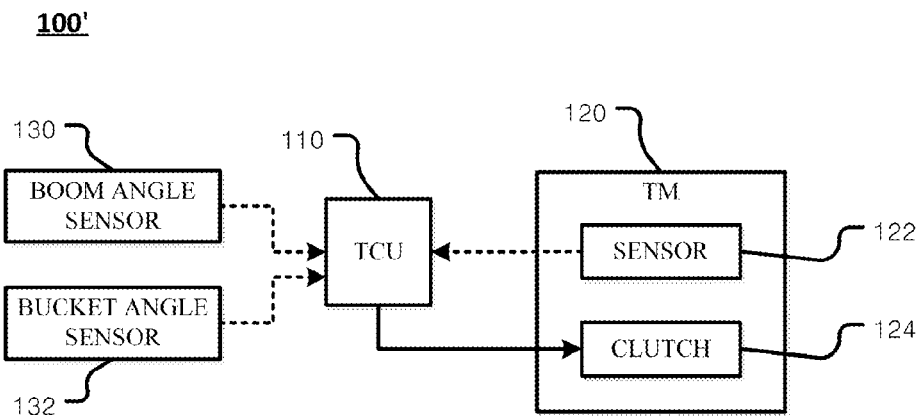
FIG. 5 is a schematic block diagram for explaining the exemplary embodiment of FIG. 4.

Meanwhile, FIG. 4 is a flow chart illustrating a method of automatically controlling a transmission, according to another exemplary embodiment of the present disclosure, and FIG. 5 is a schematic block diagram suggested for explaining the method of FIG. 4. Hereinafter, a method of controlling a transmission, according to another exemplary embodiment of the present disclosure, will be described with reference to FIGS. 4 and 5. In FIG. 5, the dotted line means transmission of information (signal), and the solid line means control.

The present exemplary embodiment is different from the aforementioned exemplary embodiment in that information is additionally transmitted from a bucket angle sensor 132 to the transmission control unit, and this information is combined with the information from the boom angle sensor 130 to be provided as bucket posture information. The bucket posture information is determined by combining the information from the boom angle sensor 130 and the information from the bucket angle sensor 132, and the information may represent, for example, whether a bucket posture is a horizontal posture in which a bottom of the bucket is disposed to be parallel to the ground level.

According to the present exemplary embodiment, when driving the wheel loader 100', the transmission control unit 110 receives information including a transmission load and a travel speed through each sensor 122 (S110), and the transmission control unit 110 receives bucket position information from the boom angle sensor 130 (S112), and receives information on a bucket posture from the bucket angle sensor 132 (S113). A value of the bucket angle sensor 132 does not directly represent the information about the bucket posture, but it is obvious that the value may be processed to be information about the bucket posture by being combined and calculated with a value of the boom angle sensor 130.

The transmission 120 includes a plurality of sensors 122, and information such as an engine RPM, a transmission load, and a travel speed may be detected by the sensors and may be transmitted to the transmission control unit 110.

Next, as whether the information (engine RPM, a transmission load, a travel speed, bucket position information, and bucket posture information) satisfies each condition denoted by S118' is checked, whether the information satisfies all predetermined conditions of S118' is checked (S114). When it is determined that the information satisfies the predetermined conditions, the transmission control unit 110 drives the transmission 120, particularly, drives the clutching means 124 in the transmission 120 so as to perform an automatic kickdown transmission from the shift stage 2 to the shift stage 1.

Meanwhile, referring to the predetermined conditions of S118', it may be known that the automatic kickdown is performed in a case in which the transmission load is low, the engine RPM and the travel speed are low, the bucket position is at the ground level (or the height adjacent to the ground level), and the bucket posture is horizontal.

For reference, an operation/driving state of the wheel loader that is operated at present may be estimated based on the information. Because the estimation is the same as those of Table 1 except for the bucket posture information, a detailed description will be omitted.

As a characteristic of an aspect of the present disclosure, in a state before the excavation operation, the transmission load is low because the state is before the excavation operation is performed, the engine RPM is also low as 1200 rpm, and the travel speed becomes low to be equal to or less than 3 km/h because a braking operation is performed to perform the operation. At this time, after checking the information about the bucket position and the bucket posture, when the bucket position is at the ground level and the bucket posture is horizontal, the automatic kickdown is performed according to an aspect of the present disclosure. That is, similarly to the aforementioned exemplary embodiment, for example, before the excavation operation is performed, the automatic kickdown is performed in advance in accordance with the predetermined conditions, and therefore, the transmission operation of the wheel loader from the shift stage 2 to the shift stage 1 is performed before the excavation operation, and as the excavation operation is performed in a gear state of the shift stage 1, a gap between an operation starting time point and a transmission time point may be prevented in advance. Further, efficiency of an operation such as the excavation operation may be improved.

Particularly, similarly to the aforementioned exemplary embodiment, the information about the bucket position in a condition before the excavation operation is advantageously used while comparing a case of a specific operation such as the loading operation.

As described above, an aspect of the present disclosure relates to a method of automatically controlling a transmission of a wheel loader, and particularly, in the case of the excavation operation, while the automatic kickdown is performed after a certain period of time has passed since the operation has been performed in the related art, according to the method of an aspect of the present disclosure, the automatic kickdown from the shift stage 2 to the shift stage 1 is performed in advance even before the excavation operation when a condition before the excavation work [for example, a low transmission load, a low engine RPM, a low travel speed, and the bucket position (height) adjacent to the ground level] is satisfied, and therefore, the excavation operation may start at the shift stage 1.

Therefore, the operation may be performed at the shift stage 1 at the beginning of the excavation operation, and as a result, efficiency of the operation may be improved. In addition, like the excavation operation and the loading operation, when the transmission conditions (an engine RPM, a transmission load, a travel speed, or the like) are similar to each other, a method of using the bucket position (height) information obtained by the boom angle sensor to differentiate the similarity is presented, and therefore the automatic kickdown may be performed only in the case of a desired operation (for example, excavation operation, or the like).

An aspect of the present disclosure may be used in an automatic control method that allows a kickdown to be automatically performed in a specific stage among a plurality of operational stages in which the wheel loader performs operations.

Although the present disclosure has been described with reference to exemplary and preferred embodiments, workers skilled in the art will recognize that changes may be made in form and detail without departing from the spirit and scope of the disclosure.

The invention claimed is:

1. A method of automatically controlling a transmission of a wheel loader which includes an engine, a transmission connected to the engine, and a transmission control unit for controlling the transmission, the method comprising:
   receiving information including a transmission load, and a travel speed from a plurality of sensors;
   receiving information about a bucket position;
   checking whether a combination of the information received from the sensors and the bucket position information satisfies a predetermined condition; and performing an automatic kickdown from shift stage 2 to shift stage 1 by driving a clutching means in the transmission, when the predetermined condition is satisfied, wherein in the checking, the predetermined condition is satisfied when the transmission load and the travel speed are lower than a predetermined reference value, and the bucket is positioned at a position that is below a predetermined position.

2. The method of claim 1, wherein the bucket position information is obtained by a boom angle sensor.

3. The method of claim 1, further comprising:

receiving, by the transmission control unit, bucket posture information, wherein the predetermined condition is satisfied additionally when a bucket posture is horizontal.

4. The method of claim 3, wherein the bucket posture information is obtained by a combination of the boom angle sensor and a bucket angle sensor.

5. The method of claim 1, wherein in the checking, the predetermined condition is satisfied even when the transmission load is high, and the travel speed is low.

6. An apparatus for automatically controlling a transmission of a wheel loader, comprising:

a transmission connected to an engine;

a sensor configured to detect a transmission load and a travel speed;

a sensor configured to detect a bucket position; and a transmission control unit configured to perform a transmission control of the transmission by receiving information from the sensors, wherein the transmission control unit performs a transmission control so that the transmission is driven at shift stage 1, when the transmission load and the travel speed are lower than a predetermined reference value and the bucket is positioned at a position that is below a predetermined position and is adjacent to the ground level.

7. The apparatus of claim 6, wherein the transmission control unit is further connected to a sensor configured to detect a posture of the bucket, and performs a transmission control to the shift stage 1, when the bucket is adjacent to the ground level and has a horizontal posture.

8. The apparatus of claim 6, wherein the transmission control unit further performs a transmission control to the shift stage 1, when the transmission load is higher than a predetermined load, and the travel speed is lower than a predetermined speed.

9. The method of claim 2, wherein in the checking, the predetermined condition is satisfied even when the transmission load is high, and the travel speed is low.

10. The method of claim 3, wherein in the checking, the predetermined condition is satisfied even when the transmission load is high, and the travel speed is low.

11. The method of claim 4, wherein in the checking, the predetermined condition is satisfied even when the transmission load is high, and the travel speed is low.

12. The apparatus of claim 7, wherein the transmission control unit further performs a transmission control to the shift stage 1, when the transmission load is higher than a predetermined load, and the travel speed is lower than a predetermined speed.

* * * * *